(12) United States Patent
Ward et al.

(10) Patent No.: US 11,818,210 B2
(45) Date of Patent: Nov. 14, 2023

(54) SYSTEMS AND METHODS OF DIRECT DATA STORAGE FOR MEASUREMENT INSTRUMENTATION

(71) Applicant: Advanced Measurement Technology Inc., Oak Ridge, TN (US)

(72) Inventors: Christopher James Ward, Basingstoke (GB); Brian Sayers, Knoxville, TN (US)

(73) Assignee: Advanced Measurement Technology, Inc., Oak Ridge, TN (US)

( * ) Notice: Subject to any disclaimer, the term of this patent is extended or adjusted under 35 U.S.C. 154(b) by 572 days.

(21) Appl. No.: 16/594,708

(22) Filed: Oct. 7, 2019

(65) Prior Publication Data

US 2021/0105320 A1 Apr. 8, 2021

(51) Int. Cl.
*H04L 67/1097* (2022.01)
*G01N 27/02* (2006.01)
*G06F 13/28* (2006.01)

(52) U.S. Cl.
CPC ....... *H04L 67/1097* (2013.01); *G01N 27/026* (2013.01); *G06F 13/28* (2013.01)

(58) Field of Classification Search
CPC .................................................. H04L 67/1097
USPC ....................................................... 702/122
See application file for complete search history.

(56) References Cited

U.S. PATENT DOCUMENTS

| | | | |
|---|---|---|---|
| 6,012,961 A | 1/2000 | Sharpe, III et al. | |
| 6,587,949 B1 | 7/2003 | Steinberg | |
| 6,954,701 B2 | 10/2005 | Wolfe | |
| 7,143,206 B2* | 11/2006 | Oda | G06F 13/28 710/36 |
| 7,395,163 B1* | 7/2008 | Morrison | G01R 31/389 324/603 |
| 8,250,250 B2* | 8/2012 | Moallem | G06F 11/25 710/22 |
| 9,092,426 B1* | 7/2015 | Bathija | G06F 12/1081 |
| 2003/0028344 A1* | 2/2003 | Pierce | G05B 23/0264 702/127 |
| 2003/0063196 A1 | 4/2003 | Palatov et al. | |
| 2003/0073341 A1* | 4/2003 | Schmid | G01D 3/022 439/478 |
| 2005/0209824 A1* | 9/2005 | Fox | G01N 33/383 702/187 |
| 2006/0044949 A1 | 3/2006 | Ferlitsch | |

(Continued)

FOREIGN PATENT DOCUMENTS

JP 2004502679 1/2004
KR 10-1948010 B1 2/2019

(Continued)

OTHER PUBLICATIONS

Patent Treaty Cooperation, Int'l Search Report, Form PCT/ISA/220; dated Jan. 26, 2021.

*Primary Examiner* — Titus Wong
(74) *Attorney, Agent, or Firm* — Pitts Lake, LLC

(57) ABSTRACT

Systems and methods of writing data acquired from measurement instrumentation. Embodiments include establishing a direct data connection between the test equipment and a network storage drive, generating test data from a sample under test, and writing the test data to the network storage drive without assistance of a computerized controlling device configured to control the testing device.

15 Claims, 1 Drawing Sheet

(56) References Cited

U.S. PATENT DOCUMENTS

| | | | |
|---|---|---|---|
| 2006/0248272 A1* | 11/2006 | del Rosario | G11C 29/44 |
| | | | 711/114 |
| 2007/0011545 A1* | 1/2007 | Fan | G01R 31/3183 |
| | | | 714/742 |
| 2007/0022218 A1* | 1/2007 | Szolyga | H04L 67/34 |
| | | | 709/250 |
| 2007/0174451 A1 | 7/2007 | Huaguang et al. | |
| 2008/0043732 A1* | 2/2008 | Desai | H04L 49/109 |
| | | | 370/389 |
| 2011/0145645 A1* | 6/2011 | Volkerink | G01R 31/31903 |
| | | | 714/E11.02 |
| 2011/0213938 A1* | 9/2011 | Kuris | G06F 13/18 |
| | | | 711/158 |
| 2012/0019643 A1* | 1/2012 | Gideon | G06Q 20/145 |
| | | | 348/E7.087 |
| 2012/0059956 A1* | 3/2012 | Narad | H04L 43/0888 |
| | | | 710/22 |
| 2013/0117769 A1* | 5/2013 | Sharma | G06F 1/3293 |
| | | | 713/320 |
| 2013/0159418 A1* | 6/2013 | Jung | H04L 65/403 |
| | | | 709/204 |
| 2014/0208160 A1* | 7/2014 | Fritzsche | G06F 11/2733 |
| | | | 714/30 |
| 2014/0266765 A1* | 9/2014 | Neeley | G08B 5/00 |
| | | | 702/183 |
| 2015/0006966 A1* | 1/2015 | Dimitrovich | H04L 67/10 |
| | | | 714/38.14 |
| 2016/0028821 A1* | 1/2016 | Petisce | A61B 5/14532 |
| | | | 709/219 |
| 2021/0033497 A1* | 2/2021 | Neeley | G06Q 20/0855 |

FOREIGN PATENT DOCUMENTS

| | | |
|---|---|---|
| WO | WO99/24907 | 5/1999 |
| WO | WO99/48016 | 9/1999 |
| WO | WO20118122131 | 7/2018 |

* cited by examiner

SYSTEMS AND METHODS OF DIRECT DATA STORAGE FOR MEASUREMENT INSTRUMENTATION

FIELD OF INVENTION

The present general inventive concept relates to systems and methods of writing data to network drives, and, in particular, relates to systems and methods writing data acquired from measurement devices directly to a network drive without requiring a computer or controlling device to assist with storing the data.

BACKGROUND

Prior art instrumentation systems use computers running data collection programs as background tasks that collect test data from measurement equipment, via various interfaces including USB, Ethernet, serial, GPIB. The computer data collection task at predefined intervals collects and holds blocks of data from the equipment in its memory, and subsequently copies that data either to internal computer disk, or to a network disk drive located on the attached network. In the areas of battery cycling, electrochemical testing, and materials electrical testing, data is typically collected from many instrument channels and loss of data in this environment is highly undesirable. Unfortunately, the aforesaid computer-based data collection system is vulnerable to data loss due to the high workload resulting from high channel count data collection and subsequent data storage, and from other potential computer issues that can include crashes and operating system lockups.

A typical system may have hundreds or even thousands of data sources or measurement channels, and the data is gathered from this array of measurement equipment by one or by many computers. Data loss in this environment is critical as often tests cannot be repeated as the samples and cells age during testing and therefore cannot be retested. A single computer failure could invalidate days, weeks or months of testing, or at the very least could incur loss of data and delays completing the tests—all of which are highly undesirable to customers in these applications.

BRIEF SUMMARY

Example embodiments of the present general inventive concept provide systems and methods of writing data acquired from instrumentation systems directly to an external network drive without the use of program tasks running on a local computer or local controlling device to collect data and then write to network or other data storage devices.

Example embodiments of the present general inventive concept can be achieved by providing a method of writing test data directly to a storage device without assistance of a computerized controlling device configured to control the testing device, including establishing a direct data connection between the testing device and a network storage drive, selecting a location on the network storage drive to store test data, using the computerized controlling device to instruct the testing device to generate test data of a sample under test, and writing the test data directly to the network storage drive as the test data becomes available, without using resources of the computerized controlling device.

Example embodiments of the present general inventive concept can also be achieved by providing a system of writing data to a storage device, including a testing device including a control module configured to establish a data connection between the testing device and a storage device, and a computerized controller device configured to instruct the testing device to begin generating test data of a sample under test, wherein the control module of the testing device is configured to instruct the testing device to write the test data to the storage device without using resources of the computerized controller device.

Example embodiments of the present general inventive concept can also be achieved by providing a method for writing data generated from battery testing equipment, comprising establishing a direct data connection between the battery testing equipment and a network disk drive, generating DC cycle and Electrochemical Impedance Spectra (EIS) data of a battery module, writing DC cycle and EIS data to the network disk drive, fitting the EIS data to an equivalent circuit model to establish equivalent circuit fit parameters, writing the circuit fit parameters to the network disk drive. Additionally the system provides a method for measuring an open circuit voltage and temperature of the battery module, writing the open circuit voltage and temperature data to the network disk drive, combining the circuit fit parameters with the open circuit voltage and temperature data to determine weighting parameters of the equivalent circuit model, writing the weighting parameters of the equivalent circuit model to the network disk drive, applying the weighting parameters to the equivalent circuit fit parameters to generate weighted equivalent circuit fit parameters, writing the weighted equivalent circuit fit parameters to the network disk drive, generating state-of-health (SoH) measurement data of the battery module based on the weighted equivalent circuit fit parameters, and writing the SoH measurement data to the network disk drive. The above data storage in this embodiment is accomplished without assistance of PC or local controller device.

Additional features and embodiments of the present general inventive concept will be set forth in the description that follows, or may be learned by practice of the present general inventive concept.

BRIEF DESCRIPTION OF THE FIGURES

The following example embodiments are representative of exemplary techniques and structures designed to carry out the objectives of the present general inventive concept, but the present general inventive concept is not limited to these example embodiments. Moreover, in the accompanying drawings and illustrations, the sizes and relative sizes, shapes, and qualities of lines, entities, and regions may be exaggerated for clarity. A wide variety of additional embodiments will be more readily understood and appreciated through the following detailed description of the exemplary embodiments, with reference to the accompanying drawings in which.

DETAILED DESCRIPTION

Figure 1:
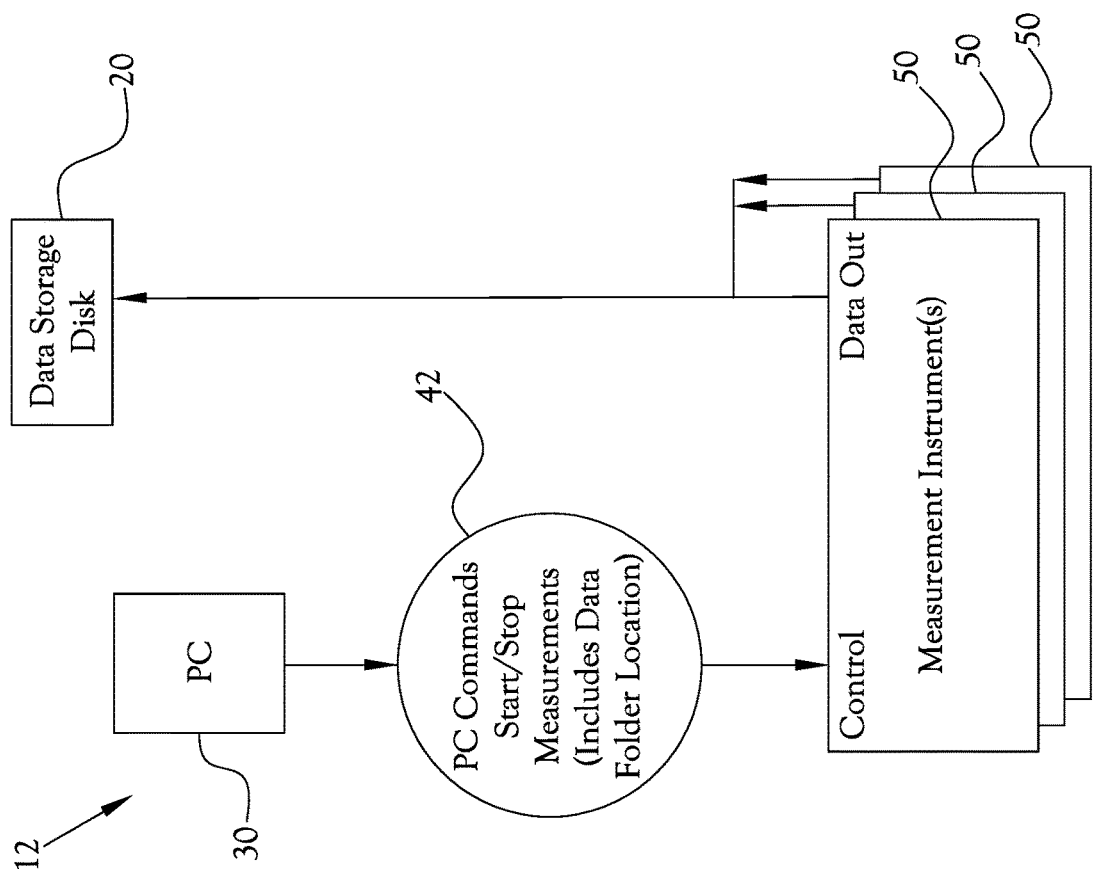
FIG. 1 is a flow diagram of a Conventional Data Storage Method.

Reference will now be made to the example embodiments of the present general inventive concept, examples of which are illustrated in the accompanying drawings and illustrations. The example embodiments are described herein in order to explain the present general inventive concept by referring to the figures.

Those skilled in the art will appreciate that the present general inventive concept can be applied to a variety of technical areas, but example embodiments can find application in instrumentation systems specifically configured for battery cycling, electrochemical testing and materials electrical testing.

Conventional and Direct Storage systems both use a PC or other controlling device to setup the tests that are to be run and to assign which instrument channels will perform the tests. Instructions are typically downloaded to those channels from the controlling device via a network connection. The PC or controlling device typically starts and subsequently monitors tests as they progress providing on-screen updates to the system users. The test will either run to completion or can be stopped at any time via command from the PC or controlling device. System control in both cases is from the controlling device, but the method for data storage is very different.

For the conventional system, the PC or controlling device is responsible for requesting and collecting data from the measurement channels on a regular basis. The PC periodically has to send "Request data" commands to each instrument and if data is available, the PC initiates transfers of data from that instrument. The conventional approach adds delays as it can only request data periodically and then has to get the data, store it locally in memory, and then transfer out to disk. If for any reason the computer does not read the data from the instrument, the data will eventually be lost or overwritten by new data. When this is needed for multiple channels, the PC or controlling device can become heavily loaded and has been known to lock-up on conventional systems.

For the Direct Data storage method, the instrument channels themselves are responsible for writing data to the storage device. Specifically, firmware was developed for the instruments that is able to communicate directly with data storage devices via Ethernet networking tools. In this case, whenever data is measured it can be immediately stored directly from the measurement instrument(s), not relying on background tasks running on computer or controlling device to perform that function. The data is stored as soon as it is available, and no matter how many channels are running or how many analysis tasks are active on the PC, that transfer process is never interrupted. In this case the computer is unloaded from intensive data processing tasks that can otherwise result in crashes or lock-ups. The Direct Data storage method may be implemented using standard network IP addressing to pass data to an attached network storage device, such as those manufactured by Synology Inc.

FIG. 1 shows an example of a conventional data storage approach 10. In FIG. 1, the personal computer 30 sends commands to one or more control unit(s) of the measurement instrument(s) 50 to configure and start measurements 40. Data from the measurement instrument or instruments then has to be specifically requested 43 from the instrument channel 50 by the PC or controlling device. After the instrument 50 receives and actions the data request, the computer is able to transfer data from the data out port on the measurement instrument 50, to the data in port on the random-access memory 32 of the personal computer device 30. From the data out port of the random-access memory 32 of the personal computer device 30, it is then written to a data storage disk 20. When tests are complete the data storage process completes. At any time before test completion, the user can decide that sufficient data has been received and can send a command 40 to the instrument(s) 50 to stop the test, at which time final data output is requested from the instrument(s) 50 and writes subsequently take place via PC memory using the same procedure.

Figure 2:
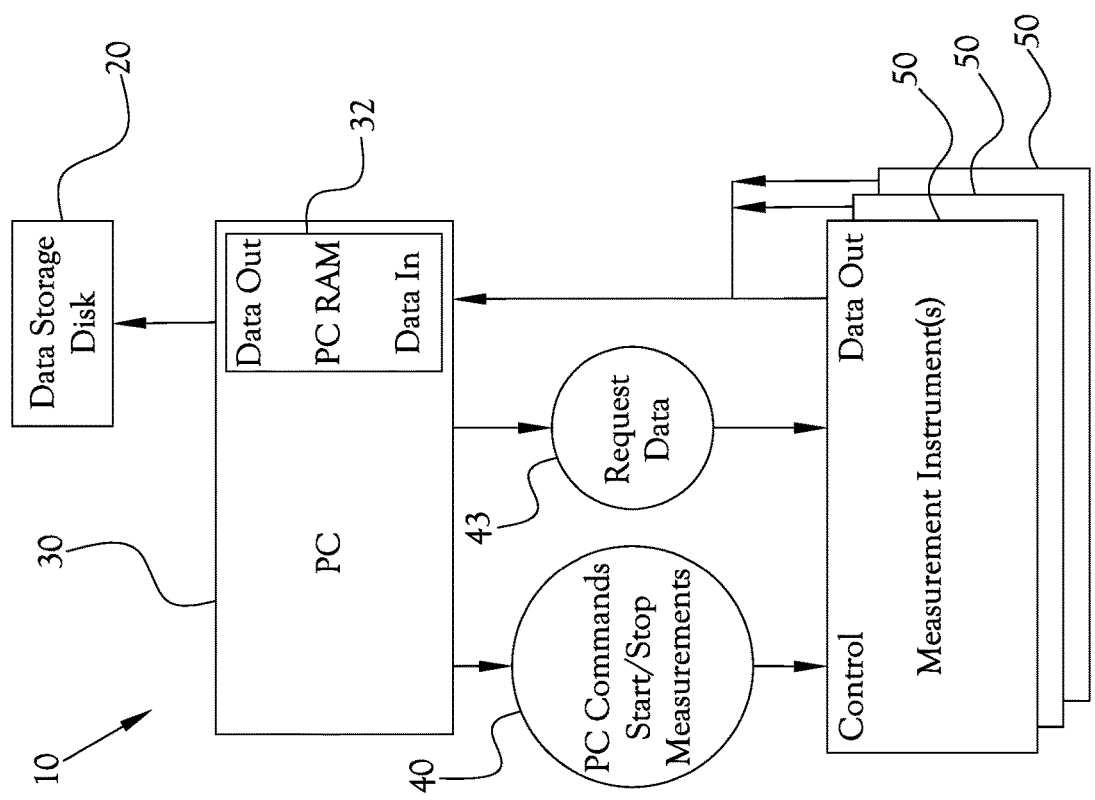
FIG. 2 is a flow diagram of a Direct Data Storage Method according to an example embodiment of the present general inventive concept.

FIG. 2 shows an example embodiment of the present general inventive concept 12. As before, the personal computer 30 sends commands to one or more control unit(s) of the measurement instrument(s) 50 to start/stop measurements. In this embodiment, the command includes data folder location information 42. As illustrated in FIG. 2, the data from the measurement instrument or instruments 50 flows directly from the data out port on the measurement instrument 50 to the data storage disk 20, bypassing the personal computer 30 completely. When tests are complete the instrument(s) complete their final data writes to the data storage device 20. As before, at any time before test completion, the user can decide that sufficient data has been received and can send a command 40 to stop the test, at which time final data writes take place from instrument(s) 50 to the data storage device 20. It is immediately apparent that the inventive concept is much simpler in its approach, requires much less PC intervention and therefore provides much higher system integrity and reliability.

Example embodiments of the present general inventive concept achieve zero-loading of system computers and other control devices as the local computer is not required to be directly involved in the process of collecting and writing data. There is additionally no need to buffer data in the equipment as the test equipment is free to write directly to the network disk drive whenever new data is available. The internal equipment data buffer cannot be overloaded and thus there is no loss of data. Computer crashes have zero effect on running the test and collecting the data. If a system control computer crashes it can be restored at any time without affecting the test run and data collection process. There is much reduced latency on the collected and viewed data, as the equipment is able to write directly to disk as soon as it is measured. If there is system power failure, the latest data will be written to disk before system shutdown, not lost in volatile computer memory.

The present general inventive concept provides the opportunity for operators to login from different locations, or from home, to monitor the tests that are not affected by disconnecting and reconnecting the computer. Computers may be added or removed from the system at any time even while tests are being run as they are not needed to write data. Network traffic is kept to a minimum, each result is transferred direct to disk requiring only one data transfer unlike the PC method that requires two, first to PC memory and then from memory to disk. The computer memory is not used in this system so another potential source of failure is eliminated. Computers are not involved in gathering or saving data, enabling them to concentrate more processing power on intensive operations such as providing channel summary information and data analysis.

In some battery test applications, an empirical model can be used to account for temperature of measurement and the State of Charge (SOC) of the cell when utilizing equivalent circuit analysis to determine the State of Health (SOH) of a Battery. An analytical framework can be configured for the prediction of capacity from Electrochemical Impedance Spectroscopy (EIS) measurements for grading used battery modules for second life applications. During the process, data can be written directly to an appointed network disk drive without assistance from the instrumentation control computer(s). One approach utilized standard shunt-based potentiostat systems, but the present general inventive concept is not limited thereto.

The above battery test embodiments can use low cost, highly reliable, small footprint, highly accurate measurement channels configured to test a large number of cells across a wide range of currents. It has been shown that the systems and methods of the present general inventive concept effectively remove 'noise factors' from EIS measurements alone, thus accounting for variabilities in the State of Charge of batteries at sorting facilities/incoming goods and the temperature of measurement. Such approaches utilize a large number of data writes from the multitude of channels, and by writing this data directly to disk, issues of computer overloading and lost data are mitigated.

The Electrochemical impedance data are then fitted to an electrical equivalent circuit model in which various passive circuit elements represent equivalent electrochemical responses in the cell. It has been found that removing 'noise factors' such as open circuit voltage (SoC) and temperature from EIS measurements alone of the battery-under-test can account for amongst other parameters variabilities in the State of Charge of batteries at sorting facilities/incoming goods and the temperature of measurement, in order to provide predictive analysis within the required tolerances.

Example embodiments of the present general inventive concept utilize a combination of different approaches to achieve reliable measurements, and reduce the testing test time for battery modules from about 3 hours to about 3 minutes or less, with no loss in grading resolution. After generating data, the inventive concept then writes directly to an appointed network disk drive without any assistance from computers. The inventive process thus eliminates multiple sources of error.

Although the present general inventive concept has been described herein in terms of certain example embodiments, those skilled in the art will appreciate that the present general inventive concept is not limited to any particular embodiment, but rather can be implemented in a variety of different applications using various components and equipment in addition to electrochemistry, materials testing, and battery cyclers.

The present general inventive concept can be embodied as computer-readable codes configured to run on a testing device to instruct the testing device to perform the data transfer operations. The computer readable-codes can be embodied on a computer-readable medium for installation on a testing device. The computer-readable medium can include a computer-readable recording medium and a computer-readable transmission medium. The computer-readable recording medium can be any data storage device that can store data as a program which can be thereafter read by a computer system. Examples of the computer-readable recording medium include read-only memory (ROM), random-access memory (RAM), CD-ROMs, DVDs, jump drives, magnetic tapes, floppy disks, and other optical or solid state data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission over a network). Also, functional programs, codes, and code segments to accomplish embodiments of the present general inventive concept can be easily construed by programmers skilled in the art to which the present general inventive concept pertains.

It is noted that the simplified diagrams and drawings do not illustrate all the various connections and assemblies of the various components, however, those skilled in the art will understand how to implement such connections and assemblies, based on the illustrated components, figures, and descriptions provided herein, using sound engineering judgment.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

While example embodiments have been illustrated and described, it will be understood that the present general inventive concept is not intended to limit the disclosure, but rather it is intended to cover all modifications and alternate devices and methods falling within the spirit and the scope of the invention as defined in the appended claims.

The invention claimed is:

1. A method of writing battery module monitoring test data directly from a testing device to a network storage drive without relaying the test data through a computerized controlling device configured to control the testing device, comprising:

establishing a direct data connection between the testing device and the network storage drive;

selecting a location on the network storage drive to store test data;

using the computerized controlling device to send instructions to the testing device to generate test data of a sample under test, wherein the test data includes DC cycle data, Electrochemical Impedance Spectroscopy (EIS) data, open circuit voltage for one or more battery modules being tested, and temperature data for one or more battery modules being tested; and writing the test data directly to the network storage drive from the testing device as the data becomes available without relaying the test data through the computerized controlling device.

2. The method according to claim 1, wherein the testing device includes a control module configured to control writing of the test data to the network storage drive.

3. The method according to claim 2, wherein the control module includes network IP addressing to write the test data to the network storage drive.

4. The method according to claim 1, wherein the testing device includes a data out port to transmit the test data to the network storage drive.

5. The method according to claim 1, wherein the writing of test data to the network storage drive is performed with zero-loading of the computerized controlling device resources.

6. The method according to claim 2, wherein the control module includes firmware to control writing of the test data to the network storage drive.

7. A system of writing battery module monitoring data to a storage device, comprising:

a testing device including a control module configured to establish a data connection between the testing device and a storage device; and a computerized controller device configured to instruct the testing device to begin generating test data of a sample under test, wherein the test data includes DC cycle data, Electrochemical Impedance Spectroscopy (EIS) data, open circuit voltage for one or more battery modules being tested, and temperature data for one or more battery modules being tested;

wherein the control module of the testing device is configured to instruct the testing device to write the test data to the storage device without relaying the test data through the computerized controller device.

8. The system according to claim 7, wherein the control module includes firmware configured to instruct the testing device to utilize instrument channels of the testing device to communicate directly with the storage device to write the test data to the storage device.

9. The system according to claim 8, wherein the control module is configured to unload background tasks running on the computerized controller device when the test data is being written to the storage device.

10. The system according to claim 7, further comprising an empirical model unit configured to account for temperature of measurement and state of charge of a cell according to an equivalent circuit analysis to determine state of health of one or more battery modules being tested and for prediction of capacity of the one or more battery modules based on the Electrochemical Impedance Spectroscopy (EIS) data to grade the one or more battery modules for second life applications.

11. The method according to claim 6, wherein the firmware is configured to instruct the testing device to utilize instrument channels of the testing device to communicate directly with the network storage drive to control writing of the test data to the network storage drive.

12. The method according to claim 11, wherein the writing of test data to the network storage drive does not utilize background tasks running on the computerized controller device, whereby the computerized controller device is unloaded from intensive data processing tasks that can otherwise result in a crash or lock-up.

13. The method according to claim 1, further comprising accounting for temperature of measurement and state of charge of a cell based on equivalent circuit analysis to determine state of health of one or more battery modules being tested and to predict capacity of the one or more battery modules based on the Electrochemical Impedance Spectroscopy (EIS) to grade the one or more battery modules for second life applications.

14. A method of writing battery module monitoring test data directly from a testing device to a network storage drive without relaying the test data through a computerized controlling device configured to control the testing device, comprising:

establishing a direct data connection between the testing device and the network storage drive;

selecting a location on the network storage drive to store test data;

using the computerized controlling device to send instructions to the testing device to generate test data of a sample under test, wherein the test data includes DC cycle data, Electrochemical Impedance Spectroscopy (EIS) data, open circuit voltage for one or more battery modules being tested, and temperature data for one or more battery modules being tested; and writing the test data directly to the network storage drive from the testing device as the data becomes available without relaying the test data through the computerized controlling device, wherein a control module of the testing device includes firmware configured to instruct the testing device to utilize instrument channels of the testing device to communicate directly with the network storage drive to write the test data to the network storage drive.

15. The method according to claim 14, further comprising an empirical model used to account for temperature of measurement and state of charge of a cell when utilizing equivalent circuit analysis to determine state of health of one or more battery modules being tested, said empirical model including an analytical framework configured for prediction of capacity from said Electrochemical Impedance Spectroscopy (EIS) data for grading used battery modules for second life applications.

* * * * *